United States Patent Office 3,453,318
Patented July 1, 1969

3,453,318
**2-t-BUTYL-5-METHYL-4,6-DINITRO-
PHENYL CARBOXYLATES**
Max Pianka, St. Albans, England, assignor to The Murphy
Chemical Company Limited, Wheathampstead, St. Albans, England, a British company
No Drawing. Continuation of application Ser. No.
411,727, Nov. 17, 1964. This application Oct. 21,
1966, Ser. No. 588,624
Claims priority, application Great Britain, May 5, 1961,
16,508/61; July 14, 1961, 25,656/61; Nov. 20, 1963,
45,818/63; Jan. 28, 1964, 3,624/64
Int. Cl. A01m 9/20; C07c 79/28
U.S. Cl. 260—479        6 Claims

ABSTRACT OF THE DISCLOSURE

There are provided compounds of the formula

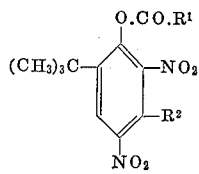

in which $R^1$ is a methyl group, an alkenyl group containing 2 or 3 carbon atoms, a halogenoalkyl group containing 1 or 2 carbon atoms or a halogeno-alkenyl group containing 2 or 3 carbon atoms and $R^2$ is a hydrogen atom or a methyl group. These compounds are useful as selective pre-emergence herbicides.

---

This application is a continuation of application Ser. No. 411,727 filed Nov. 17, 1964 and now abandoned, which application is in turn a continuation-in-part of application Ser. No. 191,347, filed Apr. 30, 1962 and also abandoned.

This invention is concerned with improvements in or relating to herbicides.

I have found that compounds of the general formula:

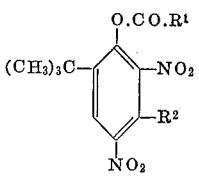
(I)

in which $R^1$ is a methyl group, an alkenyl group containing 2 or 3 carbon atoms, a halogenoalkyl group containing 1 or 2 carbon atoms or a halogeno-alkenyl group containing 2 or 3 carbon atoms and $R^2$ is a hydrogen atom or a methyl group possess significant selective herbicidal properties.

The term "halogeno" is used herein to indicate chloro or bromo.

These compounds thus have interesting properties as pre-emergence herbicides because of their exceptional selectivity particularly in the control of weeds in crops of sugar beet, leguminosae and cereals.

According to an embodiment of the invention, therefore, there is also provided a method of controlling weeds in a crop particularly of sugar beet, cereals or leguminosae, which comprises applying an effective amount of a compound of the general Formula I above to soil before the emergence of the crop seedlings or the planting in of the crop.

The pre-emergence herbicides according to the invention may be applied to the soil before, during or after the preparation of the seed bed provided they are not applied after the emergence of the crop seedlings. Where the crop is planted in to the bed the soil should be treated with the herbicides before the planting in of the crop.

The compounds according to the invention may be prepared in any desired way. In one convenient method of preparation of compounds of general Formula I the corresponding phenol:

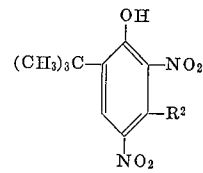
(II)

where $R^2$ has the meaning defined above, or a functional derivative thereof is reacted with an acylating derivative of an acid of the general formula $R^1$—COOH (III) where $R^1$ has the above meaning. By a functional derivative of the phenol (II) I mean such derivatives as the corresponding alkali metal phenoxides which react with reagents such as acid halides to give the same product as does the parent phenol (II).

In one convenient method of preparing the carboxylate, the phenol (II) may be reacted with an anhydride or halide of the acid of general Formula III. The halide, when used, is preferably the chloride and the reaction is preferably conducted in the presence of an acid binding agent, e.g. a tertiary base such as pyridine or dimethylaniline. The reaction is conveniently effected in the presence of an inert solvent such as diethyl ether, benzene or tetrahydrofuran.

Another method of preparing the carboxylate comprises reaction of the alkali metal phenoxide with a halide of the acid of general Formula III in solution in an inert organic solvent. Particularly suitable solvents for this reaction are ketones, e.g. acetone.

The phenoxide of (II) may as described above be preformed or, may be formed in situ in the inert organic solvent prior to introduction of the halide by reaction of the parent phenol (II) with a suitable alkali metal compound.

The preparation of the active compounds according to the invention by the reaction of an alkali metal phenoxide with a halide of an acid (III) is particularly advantageous.

However, another advantageous method comprises the simultaneous reaction of the parent phenol (II) with a halide of the acid (III) as acylating agent in an inert organic solvent (e.g. a ketone such as acetone) in the presence of a suitable alkali metal compound e.g. an alkali metal carbonate.

The selective herbicides according to the invention can be formulated for use in any desired way. Generally such formulations will include the compound in association with a suitable carrier or diluent. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier will usually be a solvent or emulsion base. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included.

The herbicides of the invention may be admixed with other herbicides e.g. to provide a broader spectrum of activity.

For the better understanding of the invention, the following examples are given by way of illustration only. In these examples temperatures are given in degrees centigrade and parts, unless otherwise stated are by weight. Where parts by weight and parts by volume are mentioned together these are to be taken as having the relationship of grams to mls.

Preparation.—Nitration of 2-t-butyl-5-methylphenol

A mixture of nitric acid (d=1.42) (482.5 ml.) and water (480 ml.) was added over a period of 2½ hrs. to a solution of 2-t-butyl-5-methylphenol (492 g.) in carbon tetrachloride (2500 ml.) with stirring. The temperature was maintained by ice-water cooling between 10 and 31°. After the addition was completed, the reaction mixture was stirred at 20° for a further hour. The reaction mixture was then filtered from a little solid that separated out. The lower organic layer was separated from the upper layer. The organic layer was washed with water (3 portions of 200 ml. each). After allowing the mixture to stand overnight, further solid that had separated was filtered off. Carbon tetrachloride (1300 cc.) was then distilled off under slightly reduced pressure from the filtrate and the residue was cooled to —9°. 2-t-butyl-4,6-dinitro-5-methylphenol crystallised out. It was filtered off and washed with petroleum, B.P. 40–60°. It weighed 272 g. and melted at 95°.

The filtrate was concentrated by distilling 700 ml. of carbon tetrachloride under slightly reduced pressure. The residue was cooled to —9° and the 2-t-butyl-4,6-dinitro-5-methylphenol that crystallised out was filtered off. It weighed 78.5 g. and melted at 92–95° C. Total weight of the combined first and second crops of 2-t-butyl-4,6-dinitro-5-methylphenol was 350.5 g. (Found: N, 10.9. Calculated for $C_{11}H_{14}N_2O_5$ N, 11.0%). Chichibabin & Bestuzhev, Bull. soc. chim., 1937, 4 (5) 439 reported M.P. 96–98°; Albert & Sears, J. Amer. Chem. Soc., 1954, 76, 4979 reported M.P. 99–100°.

EXAMPLE 1

2-t-butyl-4,6-dinitro-5-methylphenyl acetate (P1488)

2-t-butyl-4,6-dinitro-5-methylphenol (25.4 g.), potassium carbonate (97%; 7.2 g.) and acetone (100 ml.) were refluxed for 1 hr. until a clear solution was obtained. The acetone was distilled off under reduced pressure and the water present was removed from the residual solid by adding benzene (100 ml.) to it and distilling off the benzene and water. The dry potassium salt of 2-t-butyl-4,6-dinitro-5-methylphenol was dissolved in acetone (100 ml.) on refluxing and the solution cooled to 0° in an ice-salt bath. To the solution was added acetyl chloride (7.95 g.) below 5°. The mixture was kept at 0° for 1½ hours, then at room temperature for 16 hours, then refluxed for 2 hrs. The mixture was then cooled, the solid consisting mainly of potassium chloride was filtered off and washed with a little acetone. The solvent was distilled off under reduced pressure from the combined filtrate and washings. In order to eliminate any uncondensed 2-t-butyl-4,6-dinitro-5-methylphenol or its potassium salt, the residual solid was dissolved in benzene (50 ml.) and the benzene solution was washed with four 25 ml. portions of 5% aqueous potassium carbonate, then with two 25 ml. portions of water. The benzene solution was then dried over anhydrous sodium sulphate. On distilling off the benzene a solid remained. This was recrystallised from methanol. 2-t-butyl-4,6-dinitro-5-methylphenyl acetate was obtained as pale yellow prisms, M.P. 86–87°, and weighing 27.1 g. (92% yield). Found: N, 9.4. $C_{13}H_{16}N_2O_6$ requires N, 9.4%.

HERBICIDE TESTS

Pre-emergence box tests.—In boxes were sown the following crops: sugar beet, cabbage, carrots, peas and oats and the following standard weeds: shepherd's purse, fat hen, groundsel, chickweed and annual meadow grass.

P1488 was formulated as follows: 20 g. of this compound and 10 g. of a blend of non-ionic and anionic emulsifying agents were made up to 100 ml. with heavy naphtha. This solution was diluted with the appropriate quantity of water and applied to the boxes at a rate of 4 lbs. of active compound in 40 gallons of water per acre on the day of the sowing. Artificial rain equivalent to ¼" rain was then applied. The effect of this treatment was assessed after 21 days. Complete control was obtained of the following weeds: shepherd's purse, fat hen and chickweed, and moderate control of groundsel. Sugar beet, pea and oat seedlings suffered no damage. Good residual activity was noted as the boxes were still almost clean of weeds 5 weeks after treatment.

CONTROL OF WEEDS IN A SUGAR BEET CROP

In trials in a sugar beet crop similar results were obtained with no damage to the sugar beet crop and excellent control of fat hen. The control of fat hen and safety to sugar beet is an unexpected and striking property of this compound since both these species belong to the family Chenopodiaceae. This property is economically most useful as fat hen is a common weed occurring in sugar beet plantations.

When the active compound was used at half the rate, i.e. 2 lbs. per acre very similar control of weeds was obtained, and again complete control of fat hen with no damage to the sugar beet crop.

2-t-butyl-4,6-dinitro-5-methylphenyl acetate was also formulated as a wettable powder. A 25% wettable powder of the active compound was made up as follows:

25 g. of the active compound was intimately ground with
68.5 g. of speswhite (a fine grade of china clay)
0.5 g. of technical sodium lauryl sulphate
6 g. of calcium salt of lignin sulphonic acid.

This was diluted with water and applied as described earlier. The following results were obtained at 2 lb. rate per acre; individual weed counts were made:

|  | Fat Hen | Groundsel | Chickweed | Poppy | Shepherd's Purse | Others | Annual Meadow Grass | Sugar Beet |
|---|---|---|---|---|---|---|---|---|
| Treated | 1 | 18 | 5 | 7 | 1 | 29 | 44 | 4.8 |
| Untreated | 19 | 16 | 21 | 27 | 35 | 41 | 45 | 4.5 |

When propham (common name for the herbicide isopropyl N-phenylcarbamate) was used in conjunction with P1488 at the rate of 2½ lbs. of propham and 4 lbs. of P1488 per acre in box tests in addition to the weeds controlled as described above also grasses (annual meadow grass and oats) were killed, and sugar beet and peas were undamaged.

The formulation used for the following trials was a 50% wettable powder:

50 parts of the active compound was intimately ground with
43.5 parts of speswhite (a fine grade of china clay)
0.5 part of technical sodium lauryl sulphate
6.0 parts of calcium salt of lignin sulphonic acid and diluted with water to give the correct concentration of the herbicide.

RESULTS OF FIELD TRIALS

In all the tables the quantities of herbicides are in terms of actual compounds per acre.

SITE 1

The site was sown with sugar beet seeds on 9th April and the herbicides applied on 14th April as an overall spray at 50 gallons per acre. The results from counts of fat hen on the four randomised blocks are shown in Table I, each figure being from 2,000 square inches, for fat hen assessments.

TABLE I

| | Fat Hen | Control of fat hen (*Chenopodium album*) percent |
|---|---|---|
| P1488 at 1 lb. per acre | 64 | 82 |
| P1488 at 2 lbs. per acre | 14 | 96 |
| Commercial herbicide [1] | 323 | 9 |
| Untreated | 352 | |

[1] A mixture of 2¼ lbs. endothal-Na (common name for disodium 7-oxa-bicyclo[2,2,1]heptane-2,3-dicarboxylate) and 1½ lbs. of propham.

The sugar beet was unaffected.

SITE 2

The site was sown with sugar beet seeds on 30th April and the herbicides applied on 1st May in a similar manner to Site 1. The principal weed at this site was fat hen with three other weed species present to some degree. The results from counts on the randomised blocks are summarised in Table II. Each figure was taken from 2,000 square inches for weed assessments and 1,000 square inches for beet assessment.

TABLE II

| Herbicide | No. of Beet | Beet vigor | Weed vigor | Fat hen (*Chenopodium album*) | Groundsel (*Senecio vulgaris*) | Knotgrass (*Polygonum aviculare*) | Henbit (*Lamium amplexicaule*) |
|---|---|---|---|---|---|---|---|
| P1488 1 lb. per acre | 391 | 8.0 | 6.7 | 130 | 12 | 21 | 60 |
| P1488 2 lbs. per acre | 406 | 8.1 | 5.7 | 42 | 4 | 43 | 47 |
| P1488 4 lbs. per acre | 354 | 7.9 | 2.7 | 10 | 3 | 19 | 27 |
| PCA[1] 2.8 lbs. per acre | 375 | 7.8 | 9.3 | 266 | 5 | 39 | 39 |
| Commercial Herbicide [2] | 423 | 7.5 | 7.0 | 248 | 6 | 17 | 29 |
| Untreated | 385 | 10 | 10 | 337 | 26 | 34 | 76 |

[1] PCA is the abbreviation for the commercial herbicide 5-amino-4-chloro-2-phenyl-3-pyridazone.
[2] As in Table I, footnote 1.

SITE 3

This site was sown with sugar beet seeds on 7th April, and the herbicides were applied on the following day in a similar manner to Site 1. The principal weed at this site was knotgrass, fat hen being almost absent, and other weeds being present only to a small degree.

Table III summarises the result of counts conducted as before:

TABLE III

| | No. of beet | Beet vigor | Weed vigor | Knotgrass (*Polygonum aviculare*) | Mayweed (Anthemis species) | Field pansy (*Viola arvensis*) |
|---|---|---|---|---|---|---|
| P1488 at 2 lbs. per acre | 428 | 7.7 | 6 | 88 | 31 | 6 |
| P1488 at 1 lb. per acre | 395 | 7 | 3.5 | 30 | 2 | 12 |
| PCA at 2.8 lbs. per acre | 456 | 8.2 | 3.7 | 220 | 6 | 36 |
| Untreated | 455 | 10 | 10 | 353 | 17 | 31 |

The results from Sites 1 and 2 demonstrate the efficiency of the active compound against fat hen.

Results from Site 3 demonstrate the activity of P1488 against knotgrass, an important weed.

Results of sugar beet trials in Holland

Trials in Holland were conducted with a mixture of P1488/endothal/ and propham. A mixture of 1.4 lbs. endothal and 1.17 lb. of propham per acre is normally applied on the "black sand" type of soil and never gives as high as an 80% control of weeds. However, the mixture of P1488/endothal/propham applied at the rate of 0.45 lb. of P1488, 0.61 lb. endothal, 1.32 lb. of propham per acre gave 80% control of weeds, while PCA applied at 3½ lb. per acre gave only 70% control of weeds. Again an excellent control of fat hen was obtained, this being a weed which is not controlled by a mixture of propham and endothal. On a specimen section of the untreated plot 25 fat hens were counted: on the specimen section of the treated plot there was only 1 fat hen.

On clay soil on which a mixture of 2.8 lb. of endothal and 2.34 lb. of propham per acre gives less than 60% control of cleavers (*Galium aparine*), the mixture of P1148/endothal/propham applied at the rate 0.75 lb./1 lb./2.2 lb. respectively gave 70% control of this weed. Also an equivalent control of Matricaria sp. and *Polygonum persicaria* to that of enthal/propham mixture was obtained even though the combined weight of P1148/endothal/propham was lower than that of the endothal/propham mixture.

EXAMPLE 2

2-t-butyl-4,6-dinitro-5-methylphenyl-α-chloroacetate

This compound was prepared as in the case of Example 1 except that chloroacetyl chloride was used. 2-t-butyl-4,6-dinitro-5-methylphenyl-chloroacetate was obtained as pale yellow prisms, M.P. 88–89.5° (from ethanol; 69% yield) (Found: Cl, 10.7; N, 8.3. $C_{13}H_{15}ClN_2O_6$ requires Cl, 10.7; N, 8.5%).

This was formulated as follows: 10 g. of the active compound and 20 g. of a polyethylene glycol ether were made up to 100 ml. with acetone. This was applied in a pre-emergence box test as described in Example 1. It showed similar activity against weeds, with practically no damage to sugar beet and no damage to pea seedlings.

EXAMPLE 3

2-t-butyl-4,6-dinitro-5-methylphenyl acrylate 2-t-butyl-4,6-dinitro-5-methylphenol (7.62 g.) and potassium carbonate (2.5 g.), in acetone (50 ml.), were heated under reflux for 30 min. The acetone was then removed under reduced pressure. To the residue benzene (50 ml.) was added and the benzene and water formed during the reaction were slowly distilled off. The solid residue was dissolved in acetone (50 ml.). To the solution cooled to 0° acrylyl chloride (2.72 g.) was added. The mixture was allowed to stand for 17 hr., then heated under reflux for 1 hr. 10 min. The precipitated potassium chloride was filtered off and the acetone was removed from the filtrate under reduced pressure. The residue was dissolved in benzene (50 ml.) and the benzene solution was washed twice with aqueous 1 N-sodium carbonate solution, then with water, and dried over anhydrous sodium sulphate. After filtration the benzene was removed from the filtrate under reduced pressure. The residue was recrystallised from petroleum (B.P. 60–80°). 2-t-butyl-4,6-dinitro-5-methylphenyl acrylate was obtained as yellow prisms, M.P. 87–90°. (Found: N, 8.9, $C_{14}H_{16}N_2O_6$ requires N, 9.1%).

EXAMPLE 4

2-t-butyl-4,6-dinitro-5-methylphenyl-α-chloro-propionate

This was prepared as in Example 3, but using 2-t-butyl-4,6-dinitro-5-methylphenol (7.62 g.) and α-chloropropionyl chloride (3.81 g.). On recrystallisation from ethanol with the aid of charcoal 2-t-butyl-4,6-dinitro-5-methylphenyl α-chloro-propionate was obtained as pale yellow prisms, M.P. 77–78°, and weighting 7.64 g. (73.9% yield of theoretical). (Found: N, 8.0. $C_{14}H_{17}ClN_2O_6$ requires N, 8.1%).

EXAMPLE 5

2-t-butyl-4,6-dinitro-5-methylphenyl methacrylate

This was prepared as in Example 3, but using 2-t-butyl-4,6-dinitro-5-methylphenol (7.62 g.) and methacrylyl-chloride (3.14 g.). On recrystallisation from methanol 2-t-butyl-4,6-dinitro-5-methylphenyl methacrylate was obtained as yellow prisms, M.P. 131–133°, and weighing 7.4 g. (76.6% yield of theoretical). (Found: N, 8.7. $C_{15}H_{18}N_2O_6$ requires N, 8.7%).

The compounds of Examples 3 and 4 were formulated and tested as in Example 1.

5% aqueous sodium carbonate solution. After separation, the organic layer was dried over sodium sulphate, filtered and the solvent distilled off from the filtrate. The solid residue was refluxed for 1 hour with methanol (300 cc.) the solution was decanted off from a part of the solid that did not dissolve. The solution was cooled and the crystallised solid filtered off. The part that did not dissolve was also filtered off. The combined solids were then washed with a little methanol and dried.

2,4-dinitro-6-t-butylphenyl acetate was obtained as pale yellow crystals, weighing 44.7 g. (98.9% of theory) and melting at 134.5–135.5°. (Found: N, 9.93. $C_{12}H_{14}N_2O_6$ requires N, 9.94%).

2,4-dinitro-6-t-butylphenyl acetate was formulated as follows: 15 g. of this compound and 20 g. of a blend of nonionic and anionic emulsifying agents were made up to 100 cc. with heavy naphtha. This solution was diluted with the appropriate quantity of water and applied as described.

EXAMPLE 7

2,4-dinitro-6-t-butylphenyl α-chloroacetate 2,4-dinitro-6-t-butylphenol (48 g.), benzene (400 cc.) and pyridine (15.8 g.) were heated to reflux. Chloroacetyl chloride (22.6 g.) was added dropwise. The mixture was then refluxed for 30 mins., then allowed to stand for 16 hrs. at room temperature. Water was added to the mixture to dissolve the precipitated pyridine hydrochloride. The benzene layer was washed several times with water, then it was dried over anhydrous sodium sulphate, filtered and the benzene removed from the filtrate by distillation in vacuo. The residue was then recrystallised from petroleum, B.P. 40–60°. 2,4-dinitro-6-t-butylphenyl chloroacetate was obtained as pale yellow crystals, M.P. 77–79°, weighing 29.7 g. (Found: N, 8.80. $C_{12}H_{13}ClN_2O_6$ requires N, 8.85%). 2,4-dinitro-6-t-butylphenyl chloroacetate was formulated as follows: 20 g. of this compound and 20 g. of a blend of non-ionic and anionic emulsifying agents were made up to 100 cc. with heavy naphtha. This solution was diluted with the appropriate quantity of water and applied as described.

EXAMPLE 8

2,4-dinitro-6-t-butylphenyl α-chloropropionate

This was prepared using the general method of Example 7 from 2,4-dinitro-6-t-butylphenol and α-chloropropionyl chloride, 2,4-dinitro-6-t-butylphenyl α-chloropropionate was obtained as a white crystalline solid, M.P.

| | Weed | | | | | | Crop | | | | |
|---|---|---|---|---|---|---|---|---|---|---|---|
| Product of Example | Shep. Purse | Fat Hen | Ground-sel | Poppy | Chick-weed | Annual Meadow Grass | Others | Beet | Cab-bage | Carrots | Peas | Oats |
| 3 at 4 lbs. per acre | P | G | G | | N | N | N | 4 | 5 | 5 | 5 | 5 |
| 4 at 2 lbs. per acre | C | C | P | | | | | 4 | 5 | 5 | 5 | 5 |

Weed control and crop damage are expressed as follows:

Weed control: C=Complete, G=Good, M=Moderate, P=Poor N=No control
Crop damage: 5=No damage, 4=slight damage.

It will be noted that the acrylate had poorer herbicidal activity than the α-chloropropionate, although both were good on fat hen.

EXAMPLE 6

2,4-dinitro-6-t-butylphenyl acetate (P1108)

2,4-dinitro-6-t-butylphenol (36 g.) was refluxed for 8 hrs. with acetic anhydride (61 g.). The volatile constituents were then removed from the solution by heating at 100° and 20 min.

The residual light-brown solid was dissolved in benzene (200 cc.) and extracted twice with 100 cc. portions of 59–59.5° (from petroleum, B.P. 40–60°) (Found: N, 8.50. $C_{13}H_{15}ClN_2O_6$ requires N, 8.47%).

2,4-dinitro-6-t-butylphenyl α-chloropropionate was formulated as follows: 30 g. of this compound and 15 g. of a blend of non-ionic and anionic emulsifying agents were made up to 100 cc. with heavy naphtha. This solution was diluted with the appropriate quantity of water and applied as described.

EXAMPLE 9

2,4-dinitro-6-t-butylphenyl acrylate (P1101)

2,4-dinitro-6-t-butylphenol (36 g.) was dissolved in acetone (150 cc.) anhydrous potassium carbonate (10.8 g., 97% pure) was added and the mixture was refluxed for 1 hour. The acetone was then removed under reduced pressure by distillation. Benzene (150 cc.) was added to the residue and the solution was distilled using a Dean and Stark device to remove the water of the salt formation.

The benzene was then distilled off, the residue was dissolved in acetone (150 cc.) and cooled to 0°. Acrylyl chloride (13.8 g.) was added below 5° and the solution was stirred for 2 hrs. at 0°. The mixture was then allowed to stand overnight. It was then refluxed for 2 hrs. cooled to room temperature, the inorganic material was filtered off and the acetone was distilled off from the filtrate.

The residue was diluted with benzene (150 cc.) and washed with 5% aqueous solution of potassium carbonate (4 portions of 75 cc. each) and then with water (4 portions of 75 cc. each). The benzene solution was then dried over anhydrous sodium sulphate, filtered, and the solvent distilled off from the filtrate. The residue was recrystallised from petroleum, B.P. 60–80°. 2,4-dinitro-6-t-butylphenyl acrylate was obtained as pale yellow cubes, weighing 39.9 g. (90% of theory) and melting at 101–102° (Found: N, 9.7, $C_{13}H_{14}N_2O_6$ requires; N, 9.5%).

This compound was formulated in the same way as product of Example 7 and applied as described.

EXAMPLE 10

2,4-dinitro-6-t-butylphenyl methacrylate 2,4-dinitro-6-t-butylphenol (33.6 g.) was dissolved in benzene (280 cc.), and pyridine (11.06 g.) was added to the solution. The mixture was heated to reflux on a steam-bath and methacrylyl chloride (14.63 g.) was added through the condenser. The solution was refluxed for 1½ hrs. and allowed to stand overnight at room temperature. The pyridine hydrochloride that precipitated was filtered off and the benzene was washed with 5% potassium carbonate (4 portions of 50 cc. each) and water (3 portions of 50 cc. each). The benzene was dried over anhydrous sodium sulphate, filtered, and the solvent distilled off from the filtrate. The residue weighing 42.2 g. was crystallised from petroleum, B.P. 40–60°. 2,4-dinitro-6-t-butylphenyl methacrylate was obtained as white rhomboidal needles, weighing 35.6 g. (82.8% yield) and melting at 80–81.5% (Found: N, 8.94. $C_{14}H_{16}N_2O_6$ requires N, 9.09%).

2,4-dinitro-6-t-butylphenyl methacrylate was formulated in the same way as product of Example 7 and applied as described.

The compounds of Formula I ($R^2=H$) were tested by the following procedure.

The following crops were sown in boxes: sugar beet, cabbage, carrots, peas and oats and the following standard weeds: fat hen, shepherd's purse, poppy, chickweed, annual meadow grass. The esters were dissolved in a suitable solvent to which an emulsifying agent was added, diluted to the required concentration with water and applied to the boxes at a rate of 2 lbs. of the active ester in 40 gallons of water per acre on the day of the sowing. Artificial rain equivalent to ¼" rain was then applied. The effect of this treatment was assessed after 21 days. The results are shown in Table I.

Weed control is expressed as follows:
  C=complete
  G=good
  M=moderate
  P=poor
  N=no control Crop damage is expressed as follows:
  5=no damage
  4=slight damage
  3=moderate damage
  2=severe damage
  1=very severe damage
  0=complete kill In the following Table IV the activity of the 2,4-dinitro-6-s-amyl compound of Formula I ($R^2=H$) is given for comparative purposes only.

TABLE IV

| 6-alkyl group | $R^1$ | Weed | | | | | Crop | | | | |
|---|---|---|---|---|---|---|---|---|---|---|---|
| | | Fat Hen | Shepherd's Purse | Poppy | Chickweed | Annual Meadow Grass | Sugar beet | Cabbage | Carrots | Peas | Oats |
| t-Butyl | Methyl | C | C | C | G | P | 4 | 2 | 4 | 5 | 5 |
| Do | α-Chloromethyl | C | C | C | M | M | 5 | 2 | 3 | 5 | 5 |
| Do | α-Chloroethyl | C | C | M | G | M | 5 | 3 | 3 | 5 | 5 |
| Do | Vinyl | C | C | C | G | N | 5 | 2 | 4 | 4 | 5 |
| Do | Isopropenyl | C | C | C | M | N | 5 | 5 | 3 | 5 | 5 |
| s-Amyl | Methyl | N | M | N | M | N | 5 | 5 | 5 | 5 | 5 |
| Do | α-Chloromethyl | P | M | N | N | P | 5 | 5 | 4 | 5 | 5 |
| Do | Vinyl | P | C | C | N | N | 5 | 5 | 5 | 5 | 5 |
| Do | Isopropenyl | P | G | N | N | P | 5 | 5 | 2 | 5 | 5 |
| s-Butyl | Methyl | M | C | P | G | P | 4 | 4 | 5 | 5 | 5 |

A further series of tests were conducted to compare the pre-emergence herbicidal activity of 2,4-dinitro-6-tert. butylphenol esters of Formula I ($R^2=H$) and the corresponding esters of 2,4-dinitro-6-sec. butyl-phenol. The tests were conducted in like manner to these described above except that the kill of weeds were expressed differently i.e. the actual weeds in the boxes that survived the treatment were counted and the percentage of total weed control expressed as:

$$100 - \frac{Bu - Bt}{Bu} \times 100$$

where
  $Bu$=Number of weeds in untreated boxes
  $Bt$=Number of weeds in treated boxes.

Crop damage was estimated as before. The results are shown in Table V.

TABLE V

| 6-alkyl group | $R^1$ | Weed | | | | | | | Percent Total weed control | Crop | | | | |
|---|---|---|---|---|---|---|---|---|---|---|---|---|---|---|
| | | Fat hen | Shepherd's Purse | Groundsel | Poppy | Chickweed | Annual Meadow Grass | Others | Total weeds | | Sugar beet | Cabbage | Carrots | Peas | Oats |
| t-Butyl | α-Chloromethyl | 2 | 0 | 1 | 0 | 8 | 33 | 15 | 59 | 72 | 4.5 | 1.0 | 5.0 | 4.5 | 5.0 |
| Do | α-Chloroethyl | 0 | 0 | 0 | 0 | 5 | 38 | 8 | 51 | 76 | 4.5 | 2.5 | 4.5 | 3.5 | 5.0 |
| Do | Vinyl | 0 | 0 | 0 | 0 | 2 | 32 | 8 | 42 | 80 | 5.0 | 1.5 | 4.5 | 5.0 | 5.0 |
| Do | Isopropenyl | 1 | 0 | 1 | 0 | 11 | 33 | 14 | 60 | 72 | 5.0 | 1.0 | 4.5 | 5.0 | 5.0 |
| Do | Prop-1-enyl | 0 | 0 | 1 | 0 | 4 | 31 | 17 | 53 | 75 | 5.0 | 1.5 | 4.0 | 5.0 | 5.0 |
| s-Butyl | α-Chloromethyl | 0 | 0 | 4 | 1 | 28 | 48 | 20 | 101 | 52 | 5.0 | 3.0 | 4.5 | 4.5 | 5.0 |
| Do | α-Chloroethyl | 2 | 0 | 7 | 0 | 24 | 43 | 31 | 107 | 49 | 5.0 | 4.0 | 4.5 | 5.0 | 4.0 |
| Do | Vinyl | 4 | 1 | 6 | 0 | 20 | 55 | 28 | 114 | 46 | 5.0 | 3.5 | 4.5 | 5.0 | 5.0 |
| Do | Isopropenyl | 0 | 0 | 8 | 0 | 24 | 45 | 18 | 95 | 55 | 4.0 | 4.5 | 5.0 | 5.0 | 5.0 |
| Do | Prop-1-enyl | 2 | 0 | 5 | 0 | 29 | 36 | 21 | 93 | 56 | 5.0 | 5.0 | 5.0 | 5.0 | 5.0 |
| Untreated | | 10 | 30 | 26 | 19 | 36 | 46 | 44 | 211 | | 4.5 | 5.0 | 5.0 | 5.0 | 5.0 |

SELECTIVE HERBICIDAL TRIALS

The following trials include, in addition to P1488, also P1101 and P1108.

Formulations of P1488

P1488 20% miscible—20 parts by weight of P1488 and 10 parts by weight of a mixture of anionic and non-ionic emulsifying agents were made up to 100 parts by volume with heavy naphtha to give a 20% w./v. solution. This was made up with water, on stirring, to the required concentration.

Rates

All applied at 50 gallons per acre, sprayer starting at the full rate and diluting down to ¼ of that rate at the end of the 36 yd. run.

Assessment

Weed counts were taken from 100 sq. in. of plot, at three positions in each treated strip, and at corresponding positions in the untreated strips. Hence in the tables are given the appropriate three rates for these positions.

TABLE VI.—WEEDS AS FRACTION OF UNTREATED

| Treatment per acre | Shepherd's purse (Capsellabursa-pastoris) | Fat hen (Chenopodium album) | Groundsel (Senecio vulgaris) | Chickweed (Stellaria media) | Annual nettle (Urtica urens) | Veronica | Grasses | Others | Total |
|---|---|---|---|---|---|---|---|---|---|
| P1488 20% Misc. at— | | | | | | | | | |
| 4 lb | 0/2 | 0/3 | 3/10 | 1/3 | 5/7 | 0/1 | 0/1 | 0/1 | 9/28 |
| 2⅔ lb | 0/1 | 0/6 | 2/6 | 0/5 | 2/8 | 0/0 | 0/2 | 0/1 | 4/29 |
| 1⅓ lb | 0/2 | 0/1 | 1/2 | 0/11 | 3/2 | 0/1 | 0/1 | 0/1 | 4/29 31 |
| P1488 25% WP. at— | | | | | | | | | |
| 4 lb | 0/16 | 0/16 | 0/2 | 0/4 | 0/6 | 0/0 | 2/2 | 0/2 | 2/48 |
| 2⅔ lb | 0/16 | 2/10 | 0/0 | 0/4 | 0/6 | 0/0 | 0/2 | 0/0 | 2/38 |
| 1⅓ lb | 2/16 | 2/14 | 0/6 | 0/4 | 0/2 | 0/1 | 4/0 | 0/2 | 8/45 |
| P1488/Propham at— | | | | | | | | | |
| 4 lb.:6 lb | 0/0 | 0/0 | 2/9 | 0/4 | 0/3 | 0/3 | 0/0 | 0/2 | 2/21 |
| 2⅔ lb.:4 lb | 0/1 | 0/1 | 2/4 | 1/8 | 0/4 | 0/1 | 0/0 | 0/4 | 3/23 |
| 1⅓ lb.:2 lb | 0/1 | 0/0 | 0/9 | 1/9 | 0/4 | 0/0 | 0/0 | 0/1 | 1/24 |
| P1488/Endothal/Propham at— | | | | | | | | | |
| 4:3:6 lb | 0/1 | 0/0 | 0/19 | 0/14 | 0/4 | 0/2 | 0/0 | 0/0 | 0/40 |
| 2⅔:2:4 lb | 0/1 | 0/0 | 4/28 | 1/11 | 0/9 | 0/0 | 0/0 | 0/0 | 5/49 |
| 1⅓:1:2 lb | 0/1 | 0/0 | 3/22 | 1/8 | 0/5 | 0/0 | 0/0 | 1/0 | 5/36 |

P1488 25% wettable powder—This was prepared as described in Example 1.

P1488/Propham in the ratio of 2 parts P1488 to 3 parts propham. (All parts by weight.)

17.1 parts of P1488, 25.65 parts of propham, 5 parts of calcium salt of lignin sulphonic acid and 1 part of technical lauryl sodium sulphate were ground and mixed intimately with 51.25 parts of speswhite (a fine grade of China clay). This was made up with water, on stirring, to the required concentration.

P1488/Endothal/Propham in the ratio of 2 parts P1488 to 1½ parts endothal to 3 parts propham. (All parts by weight.) 17.1 parts of P1488, 10 parts of a fine diatomaceous earth, 24.04 parts of speswhite, 25.65 parts of propham, 2.5 parts of speswhite on which was adsorbed 20% of a non-ionic wetter (a polyoxyethylene glycol condensate), 5 parts of disodium salt of methylene dinaphthalene sulphonic acid and 15.71 parts of technical 61.1% endothal were intimately ground and mixed. This was made up with water, on stirring, to the required concentration.

Method of application:
Overall application by logarithmic sprayer.

Layout

One unreplicated, randomized block of treated strips alternating with untreated strips each strip being 2 yds. wide and 36 yds. long.

The sugar beet was unaffected by the treatments.

P1108 7.5% Misc.—7.5 parts by weight of P1108 and 20 parts by weight of a mixture of anionic and non-ionic emulsifying agents were made up to 100 parts by volume with heavy naphtha. This 7.5% w./v. solution was made up with water, on stirring, to the required concentration.

P1108 25% wettable powder (Parts are by weight)

25 parts of P1108 were intimately ground with
68.75 parts of speswhite
0.25 parts of technical lauryl sodium sulphate and
6 parts of calcium salt of lignin sulphonic acid.

P1108/Propham.—This was formulated as in the case of P1488/Propham but using P1108 in place of P1488.

P1108/Endothal/Propham in the ratio of 1 part of P1108:1½ parts of endothal:3 parts of propham. (All parts by weight.)

8.55 parts of P1108, 10 parts of a fine diatomaceous earth, 32.59 parts of speswhite, 25.65 parts of propham, 2.5 parts of speswhite on which was adsorbed 20% of a non-ionic wetter (a polyoxyethylene glycol ether condensate), 5 parts of disodium salt of methylene dinaphthalene sulphonic acid and 15.71 parts of technical 61.6% endothal were intimately ground and mixed.

P1108/Endothal/Propham (2:1½:3).—This was formulated as in the case of P1488 but using P1108 instead of P1488.

TABLE VII.—WEEDS AS A FRACTION OF UNTREATED

| Treatment per acre | Shepherd's purse (Capsellabursa pastoris) | Fat hen (Chenopodium album) | Groundsel (Senecio vulgaris) | Chickweed (Stellaria media) | Annual nettle (Urtica urens) | Veronica | Grasses | Others | Total |
|---|---|---|---|---|---|---|---|---|---|
| P1108 7.5% Misc. at— | | | | | | | | | |
| 4 lb | 0/16 | 0/10 | 0/2 | 0/1 | 0/6 | 0/0 | 0/4 | 0/1 | 0/40 |
| 2⅔ lb | 0/24 | 0/16 | 0/0 | 0/3 | 0/4 | 0/0 | 2/1 | 0/0 | 2/48 |
| 1⅓ lb | 0/19 | 4/9 | 4/3 | 4/1 | 0/5 | 0/1 | 0/0 | 0/2 | 12/40 |
| P1108 25% WP. at— | | | | | | | | | |
| 4 lb | 0/5 | 1/8 | 1/6 | 0/3 | 0/6 | 0/0 | 3/2 | 0/0 | 5/30 |
| 2⅔ lb | 1/3 | 1/8 | 2/3 | 1/2 | 0/8 | 0/0 | 1/2 | 0/1 | 6/28 |
| 1⅓ lb | 0/3 | 1/6 | 3/4 | 5/8 | 2/0 | 0/0 | 0/0 | 0/1 | 11/22 |
| P1108/Propham at— | | | | | | | | | |
| 4:6 lb | 0/2 | 0/8 | 0/4 | 0/2 | 0/3 | 0/0 | 0/0 | 0/2 | 0/22 |
| 2⅔:4 lb | 0/13 | 0/10 | 0/0 | 2/3 | 0/4 | 0/0 | 0/0 | 0/1 | 2/31 |
| 1⅓:2 lb | 0/14 | 2/23 | 2/1 | 0/6 | 0/8 | 0/0 | 0/0 | 4/0 | 8/52 |
| P1108/Endothal/Propham at— | | | | | | | | | |
| 2:3:6 lb | 0/2 | 2/18 | 0/2 | 0/0 | 0/0 | 0/0 | 0/2 | 0/1 | 2/24 |
| 1⅓:2:4 lb | 0/12 | 2/26 | 0/6 | 0/4 | 0/6 | 0/0 | 0/0 | 0/3 | 2/57 |
| ⅔:1:2 lb | 2/10 | 2/17 | 0/3 | 2/1 | 0/3 | 0/0 | 0/2 | 2/4 | 8/40 |
| P1108/Endothal/Propham at— | | | | | | | | | |
| 4:3:6 lb | 0/1 | 2/20 | 0/3 | 0/0 | 0/0 | 0/0 | 0/2 | 0/0 | 2/26 |
| 2⅔:2:4 lb | 0/5 | 4/16 | 0/2 | 0/0 | 0/4 | 0/0 | 0/0 | 0/2 | 4/29 |
| 1⅓:1:2 lb | 0/0 | 4/19 | 0/2 | 2/2 | 0/4 | 0/0 | 0/2 | 0/2 | 6/31 |

P1101 (2,4 - dinitro - 6-t-butylphenyl acrylate).—The higher rates i.e. 4 lb. and 2⅔ lb. of P1101 per acre were damaging to the sugar beet. The lower rate gave, however, excellent control of weeds and was completely safe to the sugar beet.

Formulation of P1101

P1101 20% Misc.—20 parts by weight of P1101 and 20 parts by weight of a mixture of anionic and non-ionic emulsifying agents were made up to 100 parts by volume with heavy naphtha to give a 20% w./v. solution. This was made up with water, on stirring, to the required concentration.

P1101 25% wettable powder.—Formulated the same way as P1488.

P1101/Propham (1:3).—8.55 parts of P1101, 25.65 parts of propham, 5 parts of calcium salt of lignin sulphonic acid, 1 part of technical lauryl sodium sulphate and 59.8 parts of speswhite were ground and intimately mixed.

P1101/Propham (2:3).—This was formulated as in the case of P1488.

P1101/Endothal/Propham (2:1½:3).—This was formulated as in the case of P1488.

TABLE VIII.—WEEDS AS FRACTION OF UNTREATED

| Treatment per acre | Shepherd's purse (Capsellabursa pastoris) | Fat hen (Chenopodium album) | Groundsel (Senecio vulgaris) | Chickweed (Stellaria media) | Annual nettle (Urtica urens) | Veronica | Grasses | Others | Total |
|---|---|---|---|---|---|---|---|---|---|
| P1101 20% Misc. at 1⅓ lb | 0/0 | 0/14 | 0/3 | 0/2 | 4/4 | 0/0 | 0/0 | 0/2 | 4/25 |
| P1101 23% WP. at 1⅓ lb | 0/6 | 0/12 | 0/7 | 0/5 | 0/3 | 0/1 | 0/1 | 0/3 | 0/38 |
| P1101/Propham at ⅔:2 lb | 0/19 | 2/17 | 2/3 | 2/2 | 0/7 | 0/0 | 0/0 | 0/2 | 6/50 |
| P1101/Propham at 1⅓:2 lb | 0/7 | 2/18 | 2/1 | 0/4 | 0/14 | 0/0 | 0/0 | 0/1 | 4/45 |
| P1101/Endothal/Propham at 1⅓:1:2 lb | 0/11 | 0/11 | 0/21 | 0/4 | 0/3 | 0/1 | 0/0 | 0/2 | 0/53 |
| Endothal/Propham 2½:1½ lb | 0/4 | 12/12 | 0/2 | 2/2 | 0/2 | 0/0 | 0/2 | 0/6 | 14/30 |

The results reported in Tables VI, VII and VIII should be compared with results for the commercial mixture of endothal and propham at 2½ lb. of endothal and 1½ lb. of propham per acre (foot of Table VIII).

What is claimed is:
1. A compound of the formula:

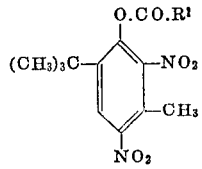

in which $R^1$ is selected from the group consisting of methyl, alkenyl of not more than 3 carbon atoms, α-chloroalkyl of not more than 2 carbon atoms and α-chloroalkenyl of not more than 3 carbon atoms.

2. 2-t-butyl-4,6-dinitro-5-methylphenyl acetate.
3. 2-t-butyl-4,6-dinitro-5-methylphenyl α-chloroacetate.
4. 2-t-butyl-4,6-dinitro-5-methylphenyl acetate.
5. 2 - t - butyl-4,6-dinitro-5-methylphenyl α-chloropropionate.
6. 2-t-butyl-4,6-dinitro-5-methylphenyl methacrylate.

References Cited

UNITED STATES PATENTS

| | | | |
|---|---|---|---|
| 2,802,883 | 8/1957 | Dietzler | 260—622 |
| 3,123,522 | 3/1964 | Scherer et al. | 260—479 |

LORRAINE A. WEINBERGER, *Primary Examiner.*

M. G. BERGER, *Assistant Examiner.*

U.S. Cl. X.R.

71—106; 260—622